United States Patent
Han et al.

(10) Patent No.: US 9,326,011 B2
(45) Date of Patent: Apr. 26, 2016

(54) METHOD AND APPARATUS FOR GENERATING BITSTREAM BASED ON SYNTAX ELEMENT

(75) Inventors: Woo-jin Han, Suwon-si (KR); Jeong-hoon Park, Seoul (KR); Hae-kyung Jung, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 802 days.

(21) Appl. No.: 12/875,459

(22) Filed: Sep. 3, 2010

(65) Prior Publication Data

US 2011/0058613 A1 Mar. 10, 2011

(30) Foreign Application Priority Data

Sep. 4, 2009 (KR) .................. 10-2009-0083512

(51) Int. Cl.
*H04N 21/2389* (2011.01)
*H04N 21/4385* (2011.01)
*H04N 19/176* (2014.01)
*H04N 19/70* (2014.01)
*H04N 19/61* (2014.01)
*H04N 19/157* (2014.01)
*H04N 19/436* (2014.01)
*H04N 19/91* (2014.01)

(52) U.S. Cl.
CPC ......... *H04N 21/2389* (2013.01); *H04N 19/157* (2014.11); *H04N 19/176* (2014.11); *H04N 19/436* (2014.11); *H04N 19/61* (2014.11); *H04N 19/70* (2014.11); *H04N 21/4385* (2013.01); *H04N 19/91* (2014.11)

(58) Field of Classification Search
CPC .................. H04N 7/26946; H04N 19/00545; H04N 19/00551; H04N 21/2389; H04N 21/4385; H04N 19/176; H04N 19/70; H04N 19/61; H04N 19/157; H04N 19/436; H04N 19/91
USPC ...................................... 375/240.16
See application file for complete search history.

(56) References Cited

U.S. PATENT DOCUMENTS 5,361,097 A * 11/1994 Kolczynski .............. 375/240.01
2002/0071485 A1 * 6/2002 Caglar et al. ............ 375/240.01

(Continued)

FOREIGN PATENT DOCUMENTS

JP 2008-312229 A 12/2008
KR 10-2000-0032248 6/2000

(Continued)

OTHER PUBLICATIONS

Office Action issued in the Korean Patent Office in Korean Patent Application No. 10-2009-0083512 on Mar. 4, 2016, and an English translation thereof.
Office Action issued in the Korean Patent Office in Korean Patent Application No. 10-2009-0083512 on Mar. 4, 2016.

*Primary Examiner* — Behrooz Senfi
*Assistant Examiner* — Maria Vazquez Colon
(74) *Attorney, Agent, or Firm* — Sughrue Mion, PLLC (57) ABSTRACT

A method and apparatus for generating an optimized bitstream. In the method, a bitstream including first and second processing units is received. The video processing units are encoded to generate syntax data for syntax elements of the video processing units. The syntax data of the video processing units are grouped according to the type of syntax element, and the groups are arranged in a predetermined order to produce the optimized bitstream.

26 Claims, 5 Drawing Sheets

(56) References Cited

U.S. PATENT DOCUMENTS

2003/0066007 A1* 4/2003 Kikuchi et al. ............... 714/752
2006/0268855 A1* 11/2006 Brandt et al. ................ 370/389
2007/0009047 A1* 1/2007 Shim et al. ............... 375/240.26
2009/0175349 A1* 7/2009 Ye et al. .................. 375/240.23
2011/0001643 A1* 1/2011 Sze et al. ...................... 341/87

FOREIGN PATENT DOCUMENTS

| | | |
|---|---|---|
| KR | 10-2007-0006445 | 1/2007 |
| WO | 2009-049248 A2 | 4/2009 |

\* cited by examiner

METHOD AND APPARATUS FOR GENERATING BITSTREAM BASED ON SYNTAX ELEMENT

CROSS-REFERENCE TO RELATED PATENT APPLICATION

This application claims priority from Korean Patent Application No. 10-2009-0083512, filed on Sep. 4, 2009, in the Korean Intellectual Property Office, the disclosure of which is incorporated herein by reference in its entirety.

BACKGROUND

1. Field

The present disclosure relates to a method and apparatus for generating a media data bitstream, and more particularly, to a method and apparatus for generating a media data bitstream that contains data regarding at least one syntax element.

2. Description of the Related Art

Media data, such as video and/or audio signals, is compressed and encoded according to various compression encoding methods so that the media data can be more easily stored or transmitted. In general, compression encoding is performed in such a way that video and/or audio signals are expressed using syntax elements.

For example, a video signal is compressed and encoded by dividing the video signal into several blocks, each block having a predetermined size, and by generating a syntax element of a motion vector, a syntax element of an encoding mode, and a syntax element of a pixel value, with respect to each of the blocks.

SUMMARY

The present disclosure provides a method and apparatus for generating a media data bitstream.

According to an exemplary embodiment, there is provided a method of generating a video data bitstream, the method including receiving a bitstream including at least one video processing unit, encoding the at least one video processing unit to generate syntax data of at least one syntax element of the at least one video processing unit; grouping the syntax data of the at least one video processing unit into at least one group according to a type of the at least one syntax element; and arranging the at least one group in a predetermined order to generate the video data bitstream.

The generating of the video data bitstream may further include allocating a header to each of the at least one group, wherein the header comprises information regarding the group to which the header belongs.

The header includes location information of a header of another group that is subsequent to the at least one group in the predetermined order.

The method may further include entropy encoding the at least one group according to different methods when the at least one group includes plural groups, respectively; and arranging the entropy encoded groups in the predetermined order.

The at least one syntax element may be one of a syntax element related to a motion vector, a syntax element related to an encoding mode, and a syntax element related to the value of a pixel.

The method may further include error-correction encoding the at least one group according to different methods when the at least one group includes plural groups, respectively.

According to another exemplary embodiment, there is provided a method of parsing a video data bitstream, the method including receiving the video data bitstream, is the video data bitstream generated by grouping syntax data of at least one syntax element of at least one video processing unit of the video data bitstream into at least one group according to a type of the at least one syntax element, the at least one group arranged in a predetermined order, extracting the at least one group from the received bitstream; parsing the at least one group and extracting the syntax data of the at least one group, respectively, to reconstruct data of the at least one video processing unit; and decoding the reconstructed data of the at least one video processing unit to generate the video data bitstream.

According to another exemplary embodiment, there is provided a method of generating a media data bitstream, the method including receiving a bitstream including at least one processing unit; encoding that at least one processing unit to generate syntax data of at least one syntax element of the at least one video processing unit; grouping the syntax data of the at least one processing unit into at least one group according to a type of the at least one syntax element; and arranging the at least one group in a predetermined order to generate the media data bitstream.

According to another aspect of the present invention, there is provided a method of parsing a media data bitstream, the method including receiving the media data bitstream, the media data bitstream generated by grouping syntax data of at least one syntax element of at least one processing unit into at least one group according to a type of the at least one syntax element, the at least one group arranged in a predetermined order; extracting the at least one group from the received bitstream; parsing the at least one group and extracting the syntax data of the at least one group, respectively, to reconstruct data of the at least one processing unit; and decoding the reconstructed data of the at least one processing unit to generate the media data bitstream.

According to another exemplary embodiment, there is provided an apparatus for generating a video data bitstream, the apparatus including an encoding unit that encodes at least one video processing unit of a received bitstream to generate syntax data of at least one syntax element of the at least one video processing unit; a grouping unit that groups the syntax data of the at least one video processing unit into at least one group according to a type of the at least one syntax element; and a bitstream generation unit that arranges the at least one group in a predetermined order to generate the video data bitstream.

According to another aspect of the present invention, there is provided an apparatus for parsing a video data bitstream, the apparatus including a bitstream separation unit that receives the video data bitstream, is the video data bitstream generated by grouping syntax data of at least one syntax element of at least one video processing unit of the video data bitstream into at least one group according to a type of the at least one syntax element, the at least one group arranged in a predetermined order; an extracting unit that extracts the at least one group from the received bitstream; a reconstruction unit that parses the at least one group and extracts the syntax data of the at least one group, respectively, and reconstructs data of the at least one video processing unit; and a decoding unit that decodes the reconstructed data of the at least one video processing unit to generate the video data bitstream.

According to another exemplary embodiment, there is provided an apparatus for generating a media data bitstream, the apparatus including an encoding unit that encodes at least one processing unit of a received bitstream to generate syntax data of at least one syntax element of at least one syntax element of the at least one processing unit; a grouping unit that groups the syntax data of the at least one processing unit into at least one group according to a type of the at least one syntax element; and a bitstream generation unit that arranges the at least one group in a predetermined order to generate the media data bitstream.

According to another exemplary embodiment, there is provided an apparatus for parsing a media data bitstream, the apparatus including a bitstream separation unit that receives the media data bitstream, the media data bitstream generated by grouping syntax data of at least one syntax element of at least one processing unit of the media data bitstream into at least one group according to a type of the at least one syntax element, the at least one group arranged in a predetermined order; an extracting unit that extracts the at least one group from the received bitstream; a reconstruction unit that parses the at least one group and extracts the syntax data of the at least one group, respectively, and reconstructs data of the at least one video processing unit; and a decoding unit that decodes the reconstructed data of the at least one processing unit to generate the media data bitstream.

According to another aspect of the present invention, there is provided a computer readable recording medium having recorded thereon a program for causing a computer to execute the bitstream generating methods and the bitstream parsing methods.

BRIEF DESCRIPTION OF THE DRAWINGS

The above and/or other features and advantages of the present disclosure will become more apparent by describing in detail exemplary embodiments thereof with reference to the attached drawings in which.

DETAILED DESCRIPTION

Figure 1:
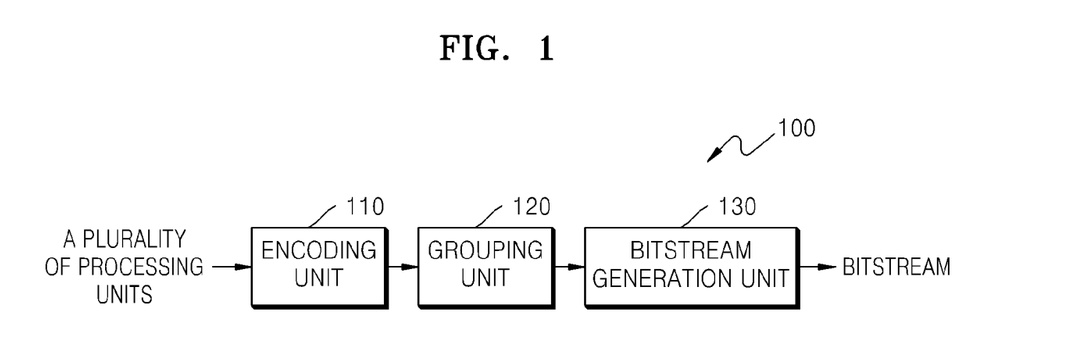
FIG. 1 is a block diagram of a bitstream generating apparatus according to an exemplary embodiment.

FIG. 1 is a block diagram of a bitstream generating apparatus 100 according to an exemplary embodiment. Referring to FIG. 1, the bitstream generating apparatus 100 includes an encoding unit 110, a grouping unit 120, and a bitstream generation unit 130.

The encoding unit 110 generates media data, which contains data regarding at least one syntax element, by encoding at least one media processing unit. That is, an audio/video (AV) signal is encoded using an encoding algorithm to generate media data of each of AV processing units. A video processing unit may be a block, e.g., a macroblock, which is included in one picture or one slice, and an audio processing unit may be an audio frame.

Media data, such as a video and/or audio signal, is divided and encoded into predetermined processing units. A video signal is encoded into video processing units, e.g., blocks, to generate video data, and an audio signal is encoded into audio frames to generate audio data. The bitstream generating apparatus 100 according to the current exemplary embodiment will now be described with respect to video data by referring to FIG. 2. However, it would be apparent to those of ordinary skill in the art that the bitstream generating apparatus 100 according to the current exemplary embodiment may also be applied to the field of audio data bitstream generation.

Figure 2:
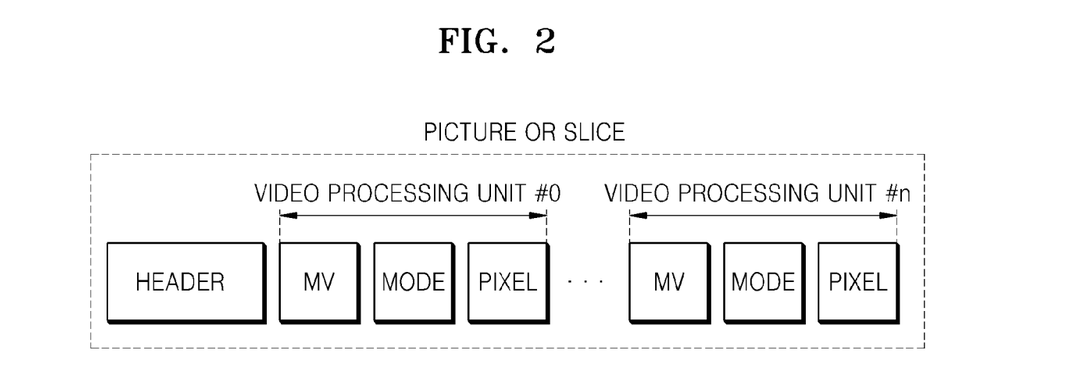
FIG. 2 illustrates the structure of at least one syntax element according to an exemplary embodiment.

FIG. 2 illustrates the structure of at least one syntax element according to an exemplary embodiment. FIG. 2 illustrates at least one syntax element of video data regarding a picture or a slice.

The encoding unit 110 of FIG. 1 divides each of pictures or slices into blocks, each block having a predetermined size, e.g., into macroblocks, in order to encode a video sequence including at least one picture and/or video slice. Next, data of at least one syntax element of each of the blocks is generated. As described above, according to a video encoding algorithm, video data of a block, which is a video processing unit, is generated by expressing the block by using at least one syntax element and generating data regarding the at least one syntax element. The at least one syntax element may include a syntax element of a motion vector, a syntax element of an encoding mode, and a syntax element of a pixel value.

The syntax element of the motion vector is used to encode a motion vector representing relative motion between a reference block and a current block when the current block is encoded using inter prediction. The syntax element of the encoding mode defines an encoding mode used to encode the current block. The syntax element of the pixel value is used to encode the value of a pixel included in the current block and may be the syntax element of a residual value that is the difference between the pixel value and a predicted value thereof.

Referring to FIG. 2, the picture or the slice contains a header and at least one block, e.g., video processing units #0 to #n. Video data of each of the video processing units #0 to #n includes data regarding a motion vector (MV), data regarding an encoding mode (MODE), and data regarding a pixel value (PIXEL).

Although FIG. 2 illustrates the structure of video data, when audio data is generated by encoding an audio signal, data of at least one syntax element that is generated in audio frame units may be contained in the audio data. If the audio signal is a stereo audio signal, the at least one syntax element may include a syntax element of a stereo parameter, a syntax element of the amplitude of a left audio channel, and a syntax element of the amplitude of a right audio channel.

Referring back to FIG. 1, the grouping unit 120 groups media data of the at least one processing unit generated by the encoding unit 110 into at least one group, according to the type of syntax element. This operation will be described in detail with respect to video data by referring to FIGS. 3A and 3B.

Figure 3A:
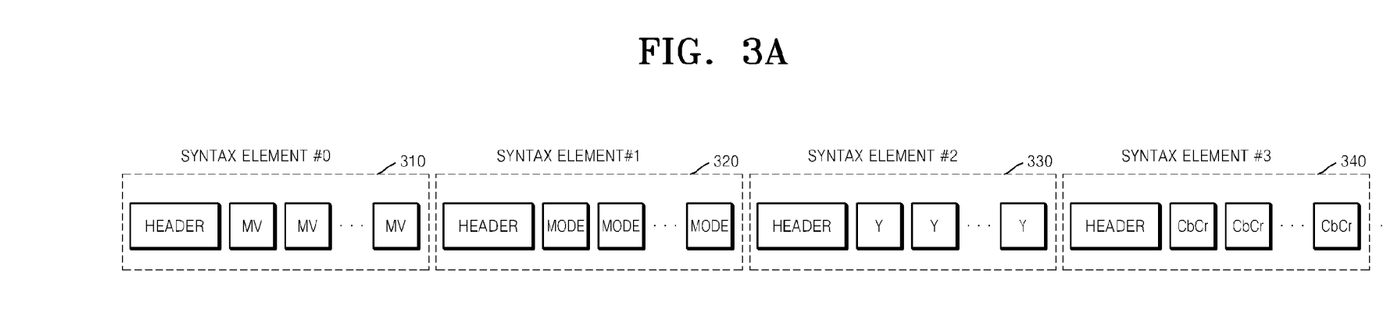
FIG. 3A illustrates the structure of a video data bitstream according to an exemplary embodiment.

FIG. 3A illustrates the structure of a video data bitstream according to an exemplary embodiment. Referring to FIGS. 1 and 3A, the grouping unit 120 groups media data of at least one video processing unit into at least one group, according to the type of syntax element, as illustrated in FIG. 3A. For example, data regarding a motion vector (MV) of a video processing unit #1, data regarding a motion vector (MV) of a video processing unit #2, . . . , to data regarding a motion vector (MV) of a video processing unit #n may be grouped into a first group 310. Similarly, and data regarding an encoding mode (MODE) of the video processing unit #1, data regarding an encoding mode (MODE) of the video processing unit #2, . . . , to data regarding an encoding mode (MODE) of the video processing unit #n may be grouped into a second group 320. Data regarding the values of pixels included in the video processing units #0 to #n may be categorized into luminance values Y and color difference signal values Cr and Cb of the video processing units #0 to #n. The luminance values Y of the video processing units #0 to #n may be grouped into a third group 330, and the color difference signal values Cr and Cb of the video processing units #0 to #n may be grouped into a fourth group 340.

As illustrated in FIG. 3A, each of the groups 310 to 340 may include a header that contains information related thereto. The header of each of the groups 310 to 340 may include information that identifies a syntax element related to the corresponding group and information that indicates the total number of video processing units from which the same syntax element is extracted to form the corresponding group.

Referring to FIG. 1, if the grouping unit 120 groups the media data of the at least one processing unit into at least one group according to the type of syntax element, then the bitstream generation unit 130 generates a media data bitstream by arranging the at least one group in a predetermined order.

The predetermined order, in which the at least one group generated according to the type of the syntax element is arranged, is not limited, but according to an exemplary embodiment, the at least one group may be arranged according to the importance or priority of the syntax element. For example, a motion vector of video data is information that needs to be processed quickly during a decoding operation, since a reference picture should first be detected using the motion vector, to detect a reference block, when a motion of a block that is to be decoded is compensated for. Thus, as illustrated in FIG. 3A, the first group 310 related to the motion vector of the at least one video processing unit is located at the beginning of the video data bitstream. Next, the second group 320, related to the encoding mode of the at least one video processing unit, is located after the first group 310. Subsequently, the third and fourth groups 330 and 340, related to the values of the pixels of the at least one video processing unit, are located sequentially after the second group 320 in the video data bitstream.

Figure 3B:
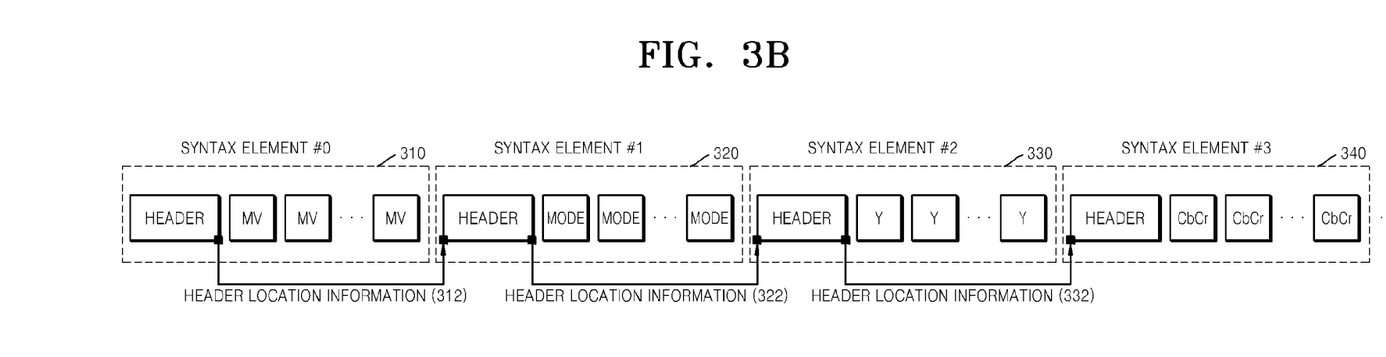
FIG. 3B illustrates the structure of a video data bitstream according to another exemplary embodiment.

FIG. 3B illustrates the structure of a video data bitstream according to another exemplary embodiment. Referring to FIG. 3B, each of at least one group of the video data contains location information of a header of a subsequent group thereof. For example, a header of a first group 310, related to a motion vector, contains location information 312 of a second group 320, related to an encoding mode, which is subsequent to the first group 310 Similarly, the header of the second group 320 contains location information 322 of a third group 330, related to a luminance value, which is subsequent to the second group 320 The distance between a current header and a subsequent header, i.e., the number of bits between these headers, may be inserted as the location information of the subsequent header, into the current header.

The bitstream generating apparatus 100 of FIG. 1 groups media data into several groups according to the type of a syntax element, thereby minimizing a time needed to parse the media data. However, if the groups classified according to the type of syntax element cannot be distinguished easily from one another, additional time is needed to detect the start and end of each of the groups when a bitstream is parsed.

Thus, the bitstream generation unit 130 inserts information regarding a starting point of a subsequent group into a header allocated to each of the respective groups so that the bitstream can be parsed quickly.

According to another exemplary embodiment, the bitstream generation unit 130 may encode the at least one group, which is generated according to the type of syntax element, according to different entropy encoding methods, as will be described in detail with reference to FIG. 4.

Figure 4:
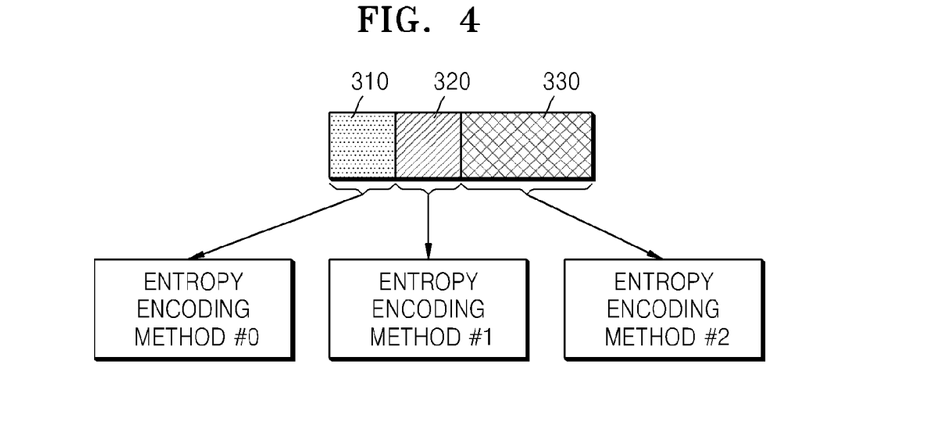
FIG. 4 illustrates an entropy encoding method according to an exemplary embodiment.

FIG. 4 illustrates an entropy encoding method according to an exemplary embodiment. According to AV encoding algorithms, data generated by encoding an AV signal is entropy encoded so that the data can be compressed at a maximum compression rate. In the case of encoding video according to the H.264 standard, a residual block is generated by inter predicting or intra predicting a block, and discrete cosine transformation (DCT) is performed on the residual block to generate discrete cosine coefficients. The discrete cosine coefficients are quantized. Then, data regarding a motion vector, an encoding mode, and the quantized discrete cosine coefficients is entropy encoded using Context-based Adaptive Variable Length Code (CAVLC) or Context-based Adaptive Binary Arithmetic Code (CABAC).

The CABAC has a higher degree of complexity than the CAVLC, and thus the CABAC requires a greater amount of calculation for entropy encoding/decoding than the CAVLC. Thus, it is inefficient to encode the data regarding the encoding mode, which does not show a high compression rate when the data is entropy encoded, by using the CABAC.

Accordingly, the bitstream generation unit 130 of FIG. 1 entropy encodes at least one group generated by the grouping unit 120 according to different entropy encoding methods. Referring to FIG. 4, a first group 310 regarding a motion vector, a second group 320 regarding an encoding mode, and a third group 330 regarding a luminance value are entropy encoded according to different entropy encoding methods, respectively. A syntax element, such as a luminance value, the rate of compression of which may be enhanced using entropy encoding, may be entropy encoded using the CABAC. On the other hand, a syntax element, such as a motion vector or an encoding mode, being encoded at a rate of compression that is not greatly enhanced using entropy encoding, may be entropy encoded using the CAVLC, thereby reducing system complexity.

According to another exemplary embodiment, the bitstream generation unit 130 may error-correction encode the at least one group generated according to the type of syntax element according to different methods, respectively, as will be described in detail with reference to FIG. 5.

Figure 5:
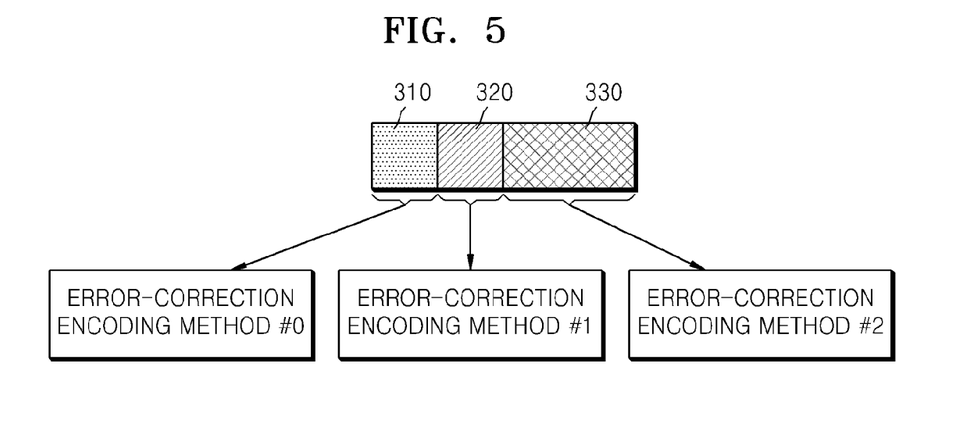
FIG. 5 illustrates an error-correction encoding method according to an exemplary embodiment.

FIG. 5 illustrates an error-correction encoding method according to an exemplary embodiment. Media data is error-correction encoded so that the media data may be transmitted or received in a wired/wireless network. Error-correction encoding is a type of channel encoding method, in which additional code is inserted into a bitstream so that a receiving side can correct an error occurring when media data is received or transmitted in a wired/wireless network. When media data is transmitted in a network where errors frequently occur, an error-correction encoding method that is robust against errors is used to encode the media data. In this case, the size of code that is additionally inserted is greater than the size of another error-correction encoding method that is not robust against errors.

According to an exemplary embodiment, the bitstream generation unit 130 of FIG. 1 error-correction encodes at least one group generated according to the type of syntax element, according to different methods, respectively. Referring to FIG. 5, a first group 310 and a second group 320 regarding syntax elements, such as a motion vector and an encoding mode, the performance of decoding of which is influenced greatly by an error occurring in some bits, may be encoded according to an error-correction encoding method that is relatively robust against errors. On the other hand, a third group 330 regarding a syntax element, such as the value of a pixel, the performance of decoding of which is hardly influenced by an error occurring in some bits, may be encoded according to an error-correction encoding method that is relatively weak against errors. Accordingly, it is possible to increase the precision of decoding while enhancing a rate of compression.

Figure 6:
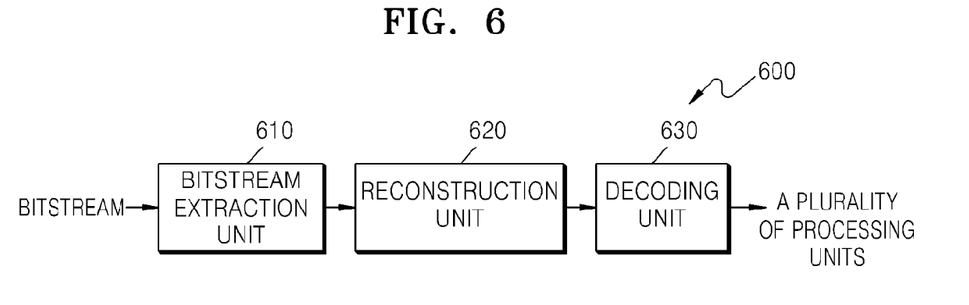
FIG. 6 is a block diagram of a bitstream parsing apparatus according to an exemplary embodiment.

FIG. 6 is a block diagram of a bitstream parsing apparatus 600 according to an exemplary embodiment. Referring to FIG. 6, according to an exemplary embodiment, the bitstream parsing apparatus 600 includes a bitstream extraction unit 610, a reconstruction unit 620, and a decoding unit 630.

The bitstream extraction unit 610 receives a media data bitstream of at least one processing unit, which is generated by grouping the media data into at least one group according to the type of syntax element and arranging the at least one group in a predetermined order, and extracts the at least one group from the bitstream.

In the case of video data, a media data bitstream of at least one video processing unit, which is generated by grouping the media data into the at least one group according to the type of a syntax element, as illustrated in FIGS. 3A and 3B, is received and extracted from the bitstream. The at least one group may be separated from the bitstream based on a header included in the at least one group. In this case, the extraction may be performed using location information of a subsequent group, which is included in a header of the at least one group.

If the at least one group is plural groups that have been entropy encoded according to different methods, respectively, then the groups are entropy decoded according to decoding methods corresponding to the different encoding methods, respectively. If the groups have been error-correction encoded according to different methods, respectively, then the groups are error-correction decoded according to decoding methods corresponding to the different encoding methods, respectively, and any errors that occur are corrected.

The reconstruction unit 620 reconstructs the media data of the at least one processing unit by parsing the at least one group extracted by the bitstream extraction unit 610. If the first to fourth groups 310 to 340 illustrated in FIGS. 3A and 3B are parsed, respectively, the media data illustrated in FIG. 2 is reconstructed.

Each of the first to fourth groups 310 to 340 illustrated in FIGS. 3A and 3B includes data regarding syntax elements thereof. For example, the first group 310, related to a motion vector, illustrated in FIG. 3A includes data regarding the motion vectors of the respective video processing units #0 to #n. Thus, the reconstruction unit 310 reconstructs the motion vectors of the respective video processing units #0 to #n by parsing the first group 310. Such an operation is performed on all the first to fourth groups 310 to 340 to reconstruct the media data of the at least one video processing unit as illustrated in FIG. 2.

According to another exemplary embodiment, a specific group may be selectively parsed from among all the groups. For example, to detect only a part of video in which a motion occurs, the part of the video may be detected by parsing only the first group 310 related to a motion vector. In order to reconstruct only black and white video, the black and white video may be reconstructed by parsing only the third group 330, related to a luminance value, without having to parse the fourth group 340 related to a color difference signal value.

Referring to FIGS. 3A and 3B, the first to fourth groups 310 to 340 are separated from one another. Thus, a user may select and parse only a desired group from among the first to third groups 310 to 340, thereby effectively performing video processing.

Figure 7:
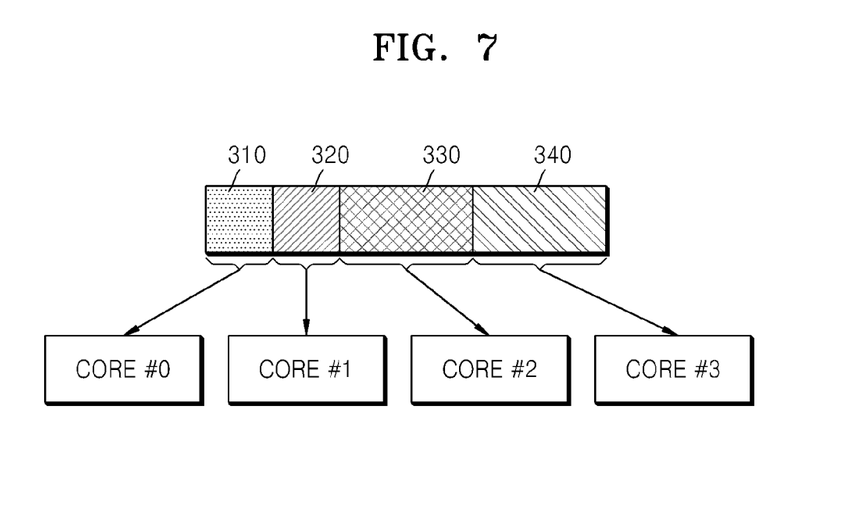
FIG. 7 illustrates a bitstream parsing method using a plurality of cores according to an exemplary embodiment.

FIG. 7 illustrates a bitstream parsing method using a plurality of cores #0 to #3, according to an exemplary embodiment. Referring to FIGS. 6 and 7, the reconstruction unit 620 may parse groups related to syntax elements by using different cores, respectively, in order to reconstruct media data of at least one video processing unit. Recently, central processing units (CPUs) of computers have been developed to perform operations in parallel by using a plurality of cores. Referring to FIG. 7, the plurality of cores #0 to #3 may reconstruct data of video processing units by parsing first to fourth groups 310 to 340, respectively, thereby performing video data parsing quickly.

Referring back to FIG. 6, the decoding unit 630 decodes media data of at least one video processing unit reconstructed by the reconstruction unit 620. The decoding unit 630 decodes the media data of the at least one video processing unit, which has been encoded according to a predetermined AV encoding algorithm, in order to reconstruct audio and/or video signals. As described above, if the reconstruction unit 620 reconstructs data regarding a specific syntax element, the specific syntax element may be decoded. If only data regarding a motion vector is reconstructed, only the value of the motion vector is decoded. If only data regarding a luminance value is reconstructed, only the luminance value is decoded.

Figure 8:
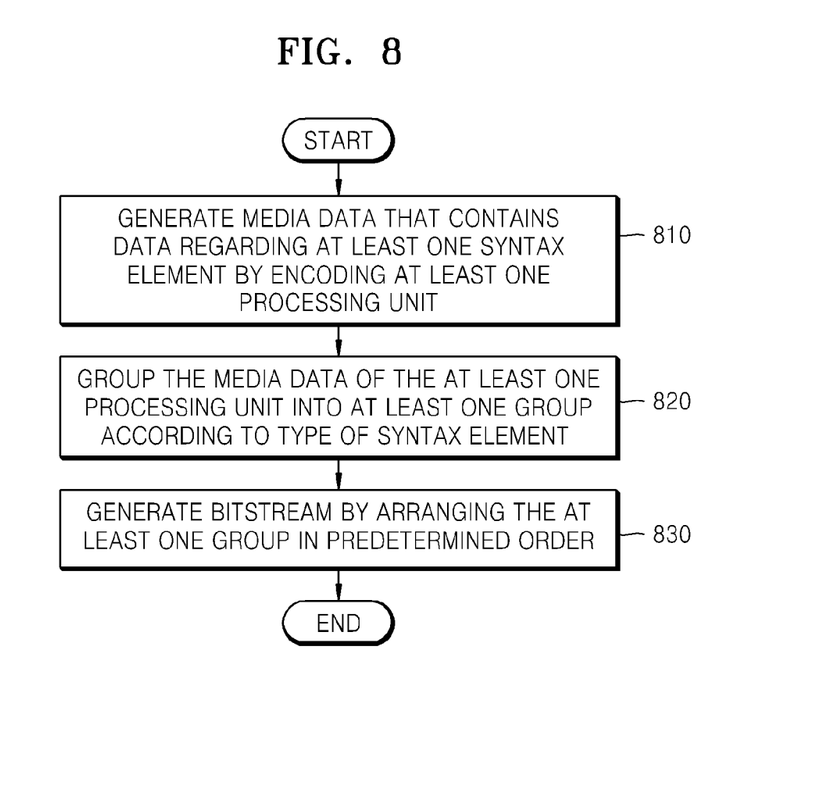
FIG. 8 is a flowchart illustrating a bitstream generating method according to an exemplary embodiment.

FIG. 8 is a flowchart illustrating a bitstream generating method according to an exemplary embodiment. Referring to FIG. 8, in operation 810, the bitstream generating apparatus 100 of FIG. 1 generates media data that contains data regarding at least one syntax element by encoding at least one processing unit. In the case of video data, as illustrated in FIG. 2, media data of at least one video processing unit, which includes data regarding a motion vector, data regarding an encoding mode, and data regarding the value of a pixel, is generated.

In operation 820, the bitstream generating apparatus 100 groups the media data of the at least one processing unit generated in operation 810 into at least one group according to the type of a syntax element. As illustrated in FIGS. 3A and 3B, the at least one group may be generated according to the type of syntax element. The at least one group may be allocated a header that contains information related thereto.

In operation 830, the bitstream generating apparatus 100 generates a bitstream by arranging the at least one group generated in operation 820 in a predetermined order. However, the method is not limited to the predetermined order, and the at least one group may be arranged according to the importance or priority of a syntax element. Also, the header allocated to the at least one group may include location information of another group subsequent to the at least one group, i.e., location information of the header allocated to a subsequent group. When the at least one group is plural groups, the plural groups may be entropy encoded or error-correction encoded according to different methods, respectively.

Figure 9:
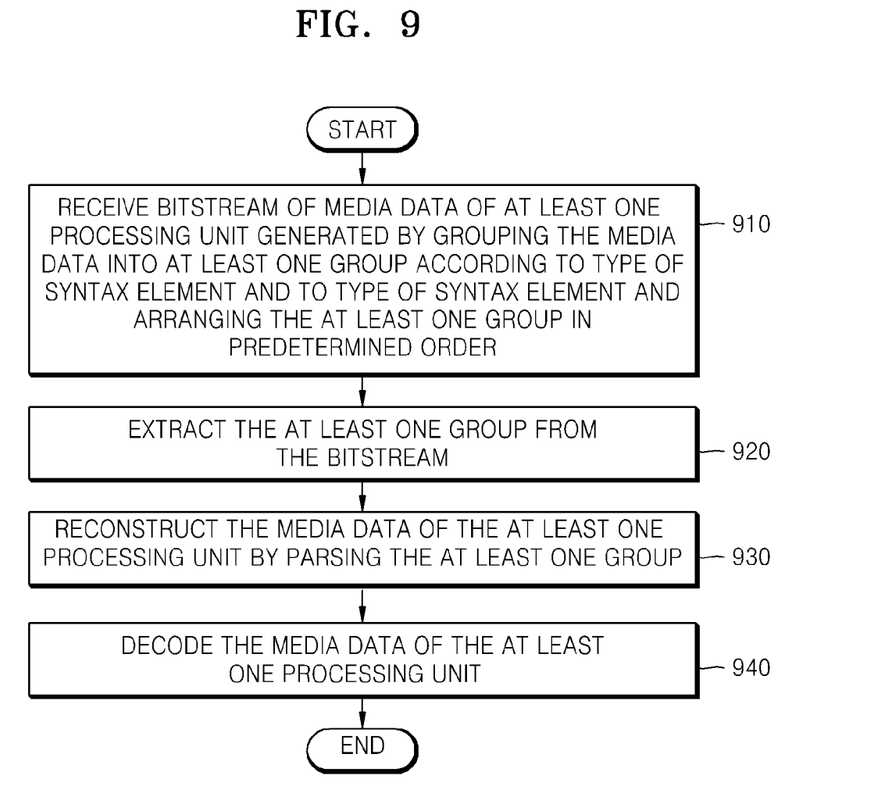
FIG. 9 is a flowchart illustrating a bitstream parsing method according to an exemplary embodiment.

FIG. 9 is a flowchart illustrating a bitstream parsing method according to an exemplary embodiment. Referring to FIG. 9, in operation 910, the bitstream parsing apparatus 600 of FIG. 6 receives a bitstream generated by the bitstream generating apparatus 100 of FIG. 1. The bitstream parsing apparatus 600 receives a media data bitstream of at least one processing unit that has been generated by grouping the media data into at least one group according to the type of syntax element and arranging the at least one group in a predetermined order.

In operation 920, the bitstream parsing apparatus 600 extracts the at least one group from the bitstream received in operation 910. The at least one group is separated from the bitstream based on a header allocated to the at least one group. The at least one group may be separated from the bitstream based on location information of another group subsequent to the at least one group, which is included in the header.

In operation 930, the bitstream parsing apparatus 600 reconstructs the media data of the at least one processing unit by parsing the at least one group separated in operation 920, respectively. The bitstream parsing apparatus 600 may parse media data, as illustrated in FIG. 3A or 3B, to reconstruct media data, as illustrated in FIG. 2. According to another exemplary embodiment, a group of a specific syntax elements may be parsed selectively. Referring to FIG. 3A or 3B, the first group 310, related to a motion vector, may be selectively parsed to detect motion in video. Alternatively, the third group 330, related to a luminance value, may be selectively parsed to reconstruct black and white video. Also, the at least one group may be parsed by different CPU cores, respectively.

In operation 940, the bitstream parsing apparatus 600 may decode the media data of the at least one processing unit reconstructed in operation 930 according to an AV decoding algorithm. An AV signal is reconstructed by decoding AV data.

A system and method according to an exemplary embodiment may be embodied as computer readable code recorded on a computer readable recording medium for causing a computer to implement the system or method when executing the computer readable code.

For example, each of the bitstream generating apparatus 100 and the bitstream parsing apparatus 600 may include a bus coupled to the elements of the bitstream generating apparatus 100 or the bitstream parsing apparatus 600 and at least one processor coupled to the bus. Also, each of the bitstream generating apparatus 100 and the bitstream parsing apparatus 600 may include a memory coupled to the bus to store a command, and coupled to the at least one processor in order to perform the command.

The computer readable medium may be any medium capable of storing data that is read and/or executed by a computer system, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the system and method may be stored and implemented as computer readable code in the distributed system.

While the exemplary embodiments have been particularly shown and described, it is understood by those of ordinary skill in the art that various changes in form and details may be made therein without departing from the spirit and scope of the exemplary embodiments as defined by the following claims.

What is claimed is:

1. A method of generating a video data bitstream, the method comprising:
encoding at least one video processing unit to generate syntax data of at least one syntax element of the at least one video processing unit;
grouping the syntax data of the at least one video processing unit into at least one group according to a type of the at least one syntax element;
allocating a header to each of the at least one group, wherein the header comprises information regarding the group to which the header belongs; and
arranging the at least one group in a predetermined order to generate the video data bitstream,
wherein the at least one group comprises a first group including a first header and a group of first syntax elements and a second group including a second header and a group of second syntax elements, and the at least one group is arranged according to importance of priority of the syntax elements included in the group of first syntax elements and the group of second syntax elements, and
wherein the first header of the first group comprises location information of the second header of the second group, the second group being arranged subsequent to the first group in the predetermined order.

2. The method of claim 1, wherein the at least one group comprises a first group and a second group, and
wherein the method further comprises:
entropy encoding the first group and the second group according to a first encoding method and a second encoding method, respectively, the first and second encoding methods being different from each other; and
arranging the entropy encoded first and second groups in the predetermined order.

3. The method of claim 1, wherein the at least one syntax element comprises at least one syntax element selected from among a syntax element related to a motion vector, a syntax element related to an encoding mode, and a syntax element related to the value of a pixel.

4. The method of claim 1, wherein the at least one group comprises a first group and a second group, and
wherein the method further comprises:
error-correction encoding the first group and the second group according to a first encoding method and a second encoding method, respectively, the first and second encoding methods being different from each other.

5. The method of claim 1, wherein the at least one video processing unit comprises at least one block or macroblock included in a picture or a slice of the received bitstream.

6. A non-transitory computer readable recording medium having recorded thereon a program which, when executed by a computer, causes the computer to execute the method of claim 1.

7. A method of parsing a video data bitstream, the method comprising:
receiving the video data bitstream, the video data bitstream generated by grouping syntax data of at least one syntax element of at least one video processing unit of the video data bitstream into at least one group according to a type of the at least one syntax element, the at least one group arranged in a predetermined order;
extracting the at least one group from the received bitstream;
parsing the at least one group and extracting the syntax data of the at least one group, respectively, to reconstruct data of the at least one video processing unit; and
decoding the reconstructed data of the at least one video processing unit,
wherein the at least one group comprises a header including information regarding the at least one group to which the header belongs,
wherein the at least one group comprises a first group including a first header and a group of first syntax elements and a second group including a second header and a group of second syntax elements, and the at least one group is arranged according to importance of priority of the syntax elements included in the group of first syntax elements and the group of second syntax elements, and wherein the first header of the first group comprises location information of the second header of the second group, the second group being arranged subsequent to the first group in the predetermined order.

8. The method of claim 7, wherein the at least one group comprises a first group and a second group, and wherein the first group is entropy encoded according to a first encoding method and the second group is entropy encoded according to a second encoding method, the first and second encoding methods being different from each other.

9. The method of claim 7, wherein the at least one syntax element comprises at least one syntax element selected from among a syntax element related to a motion vector, a syntax element related to an encoding mode, and a syntax element related to the value of a pixel.

10. The method of claim 7, wherein the at least one group comprises a first group and a second group, and wherein the first group is error-correction encoded according to a first encoding method and the second group is error-correction encoded according to a second encoding method, the first and second encoding methods being different from each other.

11. The method of claim 7, wherein the at least one video processing unit comprises at least one block or macroblock included in a picture or a slice of the received bitstream.

12. A non-transitory computer readable recording medium having recorded thereon a program which, when executed by a computer, causes the computer to execute the method of claim 7.

13. A method of generating a media data bitstream, the method comprising:

encoding at least one processing unit to generate syntax data of at least one syntax element of the at least one video processing unit;

grouping the syntax data of the at least one processing unit into at least one group according to a type of the at least one syntax element;

allocating a header to each of the at least one group, wherein the header comprises information regarding the group to which the header belongs; and arranging the at least one group in a predetermined order to generate the media data bitstream, wherein the at least one group comprises a first group including a first header and a group of first syntax elements and a second group including a second header and a group of second syntax elements, and the at least one group is arranged according to importance or priority of the syntax elements included in the group of first syntax elements and the group of second syntax elements, and wherein the first header of the first group comprises location information of the second header of the second group, the second group being arranged subsequent to the first group in the predetermined order.

14. A non-transitory computer readable recording medium having recorded thereon a program which, when executed by a computer, causes the computer to execute the method of claim 13.

15. A method of parsing a media data bitstream, the method comprising:

receiving the media data bitstream, the media data bitstream generated by grouping syntax data of at least one syntax element of at least one processing unit into at least one group according to a type of the at least one syntax element, the at least one group arranged in a predetermined order;

extracting the at least one group from the received bitstream;

parsing the at least one group and extracting the syntax data of the at least one group, respectively, to reconstruct data of the at least one processing unit; and decoding the reconstructed data of the at least one processing unit, wherein the at least one group comprises a header including information regarding the at least one group to which the header belongs, wherein the at least one group comprises a first group including a first header and a group of first syntax elements and a second group including a second header and a group of second syntax elements, and the at least one group is arranged according to importance or priority of the syntax elements included in the group of first syntax elements and the group of second syntax elements, and wherein the first header of the first group comprises location information of the second header of the second group, the second group being arranged subsequent to the first group in the predetermined order.

16. A non-transitory computer readable recording medium having recorded thereon a program which, when executed by a computer, causes the computer to execute the method of claim 15.

17. An apparatus for generating a video data bitstream, the apparatus comprising:

an encoding unit that encodes at least one video processing unit to generate syntax data of at least one syntax element of the at least one video processing unit;

a grouping unit that groups the syntax data of the at least one video processing unit into at least one group according to a type of the at least one syntax element; and a bitstream generation unit that allocates a header to each of the at least one group, respectively, wherein the header comprises location information of a header of a group subsequent to the at least one group in the predetermined order, and arranges the at least one group in a predetermined order to generate the video data bitstream, wherein the at least one group comprises a first group including a first header and a group of first syntax elements and a second group including a second header and a group of second syntax elements, and the at least one group is arranged according to importance or priority of the syntax elements included in the group of first syntax elements and the group of second syntax elements, and wherein the first header of the first group comprises location information of the second header of the second group, the second group being arranged subsequent to the first group in the predetermined order.

18. An apparatus for parsing a video data bitstream, the apparatus comprising:

a bitstream separation unit that receives the video data bitstream, is the video data bitstream generated by grouping syntax data of at least one syntax element of at least one video processing unit of the video data bitstream into at least one group according to a type of the at least one syntax element, the at least one group arranged in a predetermined order;

an extracting unit that extracts the at least one group from the received bitstream;

a reconstruction unit that parses the at least one group and extracts the syntax data of the at least one group, respectively, and reconstructs data of the at least one video processing unit; and a decoding unit that decodes the reconstructed data of the at least one video processing unit, wherein, in the video data bitstream, each of the at least one group comprises a header including location information of a header of a group subsequent to the at least one group in the predetermined order, wherein the at least one group comprises a first group including a first header and a group of first syntax elements and a second group including a second header and a group of second syntax elements, and the at least one group is arranged according to importance or priority of the syntax elements included in the group of first syntax elements and the group of second syntax elements, and wherein the first header of the first group comprises location information of the second header of the second group, the second group being arranged subsequent to the first group in the predetermined order.

19. An apparatus for generating a media data bitstream, the apparatus comprising:

an encoding unit that encodes at least one processing unit to generate syntax data of at least one syntax element of at least one syntax element of the at least one processing unit;

a grouping unit that groups the syntax data of the at least one processing unit into at least one group according to a type of the at least one syntax element; and a bitstream generation unit that allocates a header to each of the at least one group, respectively, wherein the header comprises location information of a header of a group subsequent to the at least one group in the predetermined order, and arranges the at least one group in a predetermined order to generate the media data bitstream, wherein the at least one group comprises a first group including a first header and a group of first syntax elements and a second group including a second header and a group of second syntax elements, and the at least one group is arranged according to importance of priority of the syntax elements included in the group of first syntax elements and the group of second syntax elements, and wherein the first header of the first group comprises location information of the second header of the second group, the second group being arranged subsequent to the first group in the predetermined order.

20. An apparatus for parsing a media data bitstream, the apparatus comprising:

a bitstream separation unit that receives the media data bitstream, the media data bitstream generated by grouping syntax data of at least one syntax element of at least one processing unit of the media data bitstream into at least one group according to a type of the at least one syntax element, the at least one group arranged in a predetermined order;

an extracting unit that extracts the at least one group from the received bitstream;

a reconstruction unit that parses the at least one group and extracts the syntax data of the at least one group, respectively, and reconstructs data of the at least one video processing unit; and a decoding unit that decodes the reconstructed data of the at least one processing unit, wherein, in the media data bitstream, each of the at least one group comprises a header including location information of a header of a group subsequent to the at least one group in the predetermined order, wherein the at least one group comprises a first group including a first header and a group of first syntax elements and a second group including a second header and a group of second syntax elements, and the at least one group is arranged according to importance of priority of the syntax elements included in the group of first syntax elements and the group of second syntax elements, and wherein the first header of the first group comprises location information of the second header of the second group, the second group being arranged subsequent to the first group in the predetermined order.

21. The method of claim 1, wherein the header includes information that identifies a syntax element related to the corresponding group and information that indicates the total number of video processing units from which the same syntax element is extracted to form the corresponding group.

22. The method of claim 7, wherein the header includes information that identifies a syntax element related to the corresponding group and information that indicates the total number of video processing units from which the same syntax element is extracted to form the corresponding group.

23. The apparatus of claim 17, wherein the header includes information that identifies a syntax element related to the corresponding group and information that indicates the total number of video processing units from which the same syntax element is extracted to form the corresponding group.

24. The apparatus of claim 18, wherein the header includes information that identifies a syntax element related to the corresponding group and information that indicates the total number of video processing units from which the same syntax element is extracted to form the corresponding group.

25. The method of claim 1, wherein the location information comprises the number of bits between the first header of the first group and the second header of the second group.

26. The method of claim 7, wherein the location information comprises the number of bits between the first header of the first group and the second header of the second group.

* * * * *